United States Patent
Oh-ide

(10) Patent No.: US 6,198,521 B1
(45) Date of Patent: Mar. 6, 2001

(54) LIQUID CRYSTAL DISPLAY DEVICE HAVING ELECTRODES CONNECTED AT A LOCATION CLOSE TO AN OUTSIDE EDGE OF A CONTACT HOLE

(75) Inventor: Toshio Oh-ide, Atsugi (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/004,317

(22) Filed: Jan. 8, 1998

(30) Foreign Application Priority Data

Jan. 8, 1997 (JP) .................................... 9-001022

(51) Int. Cl.[7] .................................... G02F 1/1345

(52) U.S. Cl. .................................... 349/149; 349/135

(58) Field of Search .................................... 349/139, 149

(56) References Cited

U.S. PATENT DOCUMENTS 5,625,474 * 4/1997 Aomori et al. .................... 349/79
5,861,929 * 1/1999 Spitzer .................................... 349/74

FOREIGN PATENT DOCUMENTS

04365015 * 12/1992 (JP) .

* cited by examiner

Primary Examiner—Kenneth Parker
(74) Attorney, Agent, or Firm—Oblon, Spivak, McClelland, Maier & Neustadt, P.C.

(57) ABSTRACT

A liquid crystal display device including a first substrate having a contact hole and second substrate substantially in parallel with the first substrate. Each substrate has electrodes on an inner side thereof with the electrodes of the first substrate being connected to the electrodes of the second substrate at a location which is close to an edge of the contact hole.

12 Claims, 4 Drawing Sheets

LIQUID CRYSTAL DISPLAY DEVICE HAVING ELECTRODES CONNECTED AT A LOCATION CLOSE TO AN OUTSIDE EDGE OF A CONTACT HOLE

BACKGROUND OF THE INVENTION

1. Field of the Invention

The present invention relates to a liquid crystal display device. More particularly, the present invention is related to a liquid crystal display device including electrodes on an upper substrate connected to electrodes on a lower substrate.

2. Discussion of the Background

A liquid crystal display cell includes two transparent substrates each having driving electrodes on the inner side of the substrate. The substrates are spaced apart substantially in parallel to each other forming a gap between the substrates. In addition, the gap between the two substrates contains a liquid crystal body.

A problem with a conventional liquid crystal display is that the cell gap of the liquid crystal display does not have a proper thickness because the connection of the electrodes by a sealing agent cause the liquid crystal cell to be weighted vertically. That is, the mask weight is distributed in a center of the substrates which causes uneven and undesired cell gap thicknesses, as shown, for example, in FIG. 4.

SUMMARY OF THE INVENTION

Accordingly, one object of this invention is to provide a novel liquid crystal display device in which the cell gap of the liquid crystal display maintains a predetermined thickness.

To achieve this object, the present invention provides a liquid crystal display device including a first transparent substrate having a contact hole, a second transparent substrate spaced apart substantially in parallel from the first transparent substrate to form a gap, and a liquid crystal body filling the gap between the first transparent substrate and the second transparent substrate. The first transparent substrate includes first driving electrodes and the second transparent substrate includes second driving electrodes and connection electrodes which pass through the contact hole of the first transparent substrate. In addition, the device includes external electrodes which connect to the second driving electrodes and connection electrodes through the contact hole of the first transparent substrate. The connection electrodes on the second transparent substrate are also connected to the first driving electrodes of the first transparent substrate at a location which is close to an edge of the contact hole.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawing, wherein.

DESCRIPTION OF THE PREFERRED EMBODIMENTS

Figure 1:
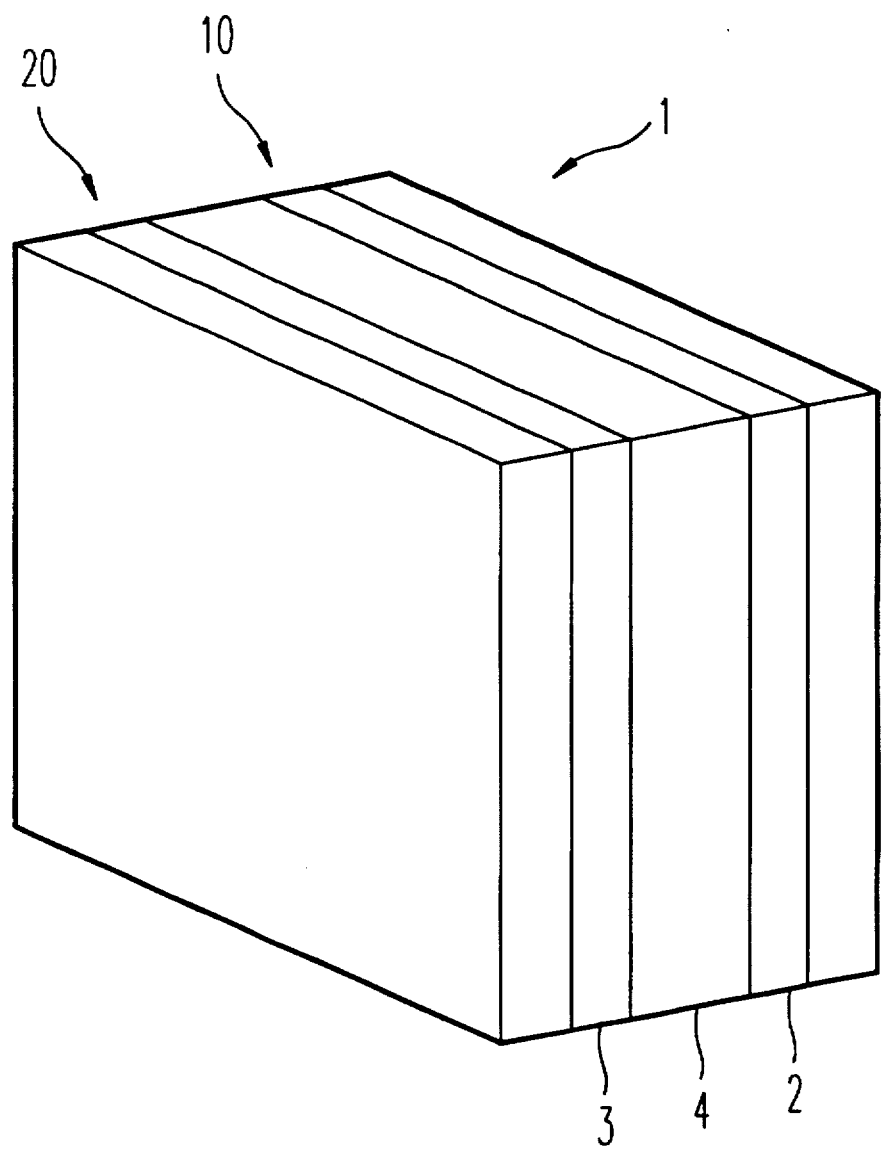
FIG. 1 shows a perspective view of a liquid crystal display device according to the present invention.

Referring now to the drawings, wherein like reference numerals designate identical or corresponding parts throughout the several views, and more particularly to FIG. 1 thereof, there is illustrated a liquid crystal display device 1 including a lower substrate 10 having electrodes 2 and an upper substrate 20 having electrodes 3. The electrodes 2 and 3 are on the inner surface of the lower and upper substrates 10 and 20, respectively.

The lower substrate 10 and upper substrate 20 may be made of, for example, plastic film with a thickness of approximately 150 μm. In addition, the gap 4 between the lower substrate 10 and the upper substrate 20 can be, for example, approximately 8 μm.

Figure 2:
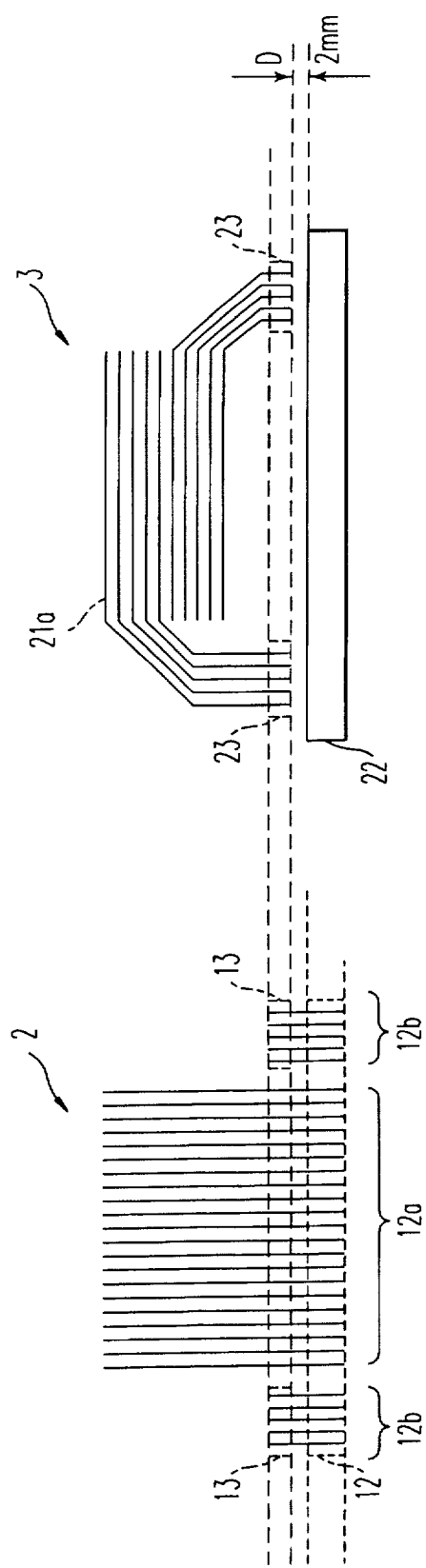
FIG. 2 shows a detailed view of electrodes on both substrates of the liquid crystal display device according to the present invention.

FIG. 2 is a detailed view of the electrodes 2 and 3. The electrodes 2 include electrodes 12 having driving electrodes 12a and connection electrodes 12b and the electrodes 3 include driving electrodes 21a. In addition, the upper substrate 20 having electrodes 3 includes a contact hole 22. The lower substrate 10 and upper substrate 20 form an empty liquid crystal cell. The numerals 13 and 23 represent locations where the connection electrodes 12b of the lower substrate 10 connect to the driving electrodes 21a of the upper substrate 20. The electrodes 12b and driving electrodes 21a may be connected by, for example, a sealing agent or any other connecting agent. The distance D between the locations 13 and 23 and the edge of the contact hole 22 is preferably less than 4 mm. For example, as shown in FIG. 2, the distance D between the locations 13 and 23 and the edge of the contact hole 22 is 2 mm. The driving electrodes 12a and connection electrodes 12b of the lower substrate 10 pass through the contact hole 22 and connect to external electrodes (not shown).

Figure 3B:
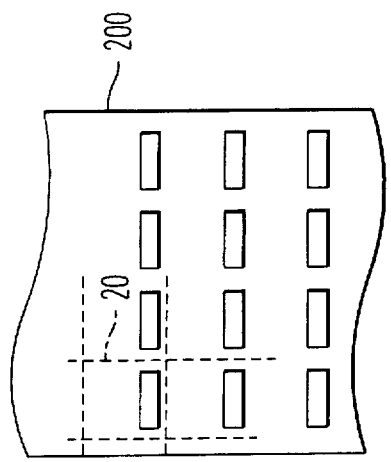
FIGS. 3a and 3b illustrate forming the substrates of the liquid crystal display device according to the present invention.
Figure 3A:
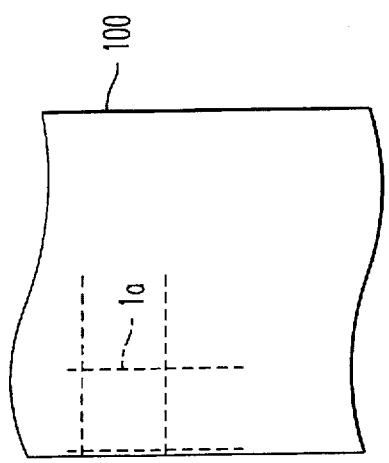
Figure 4:
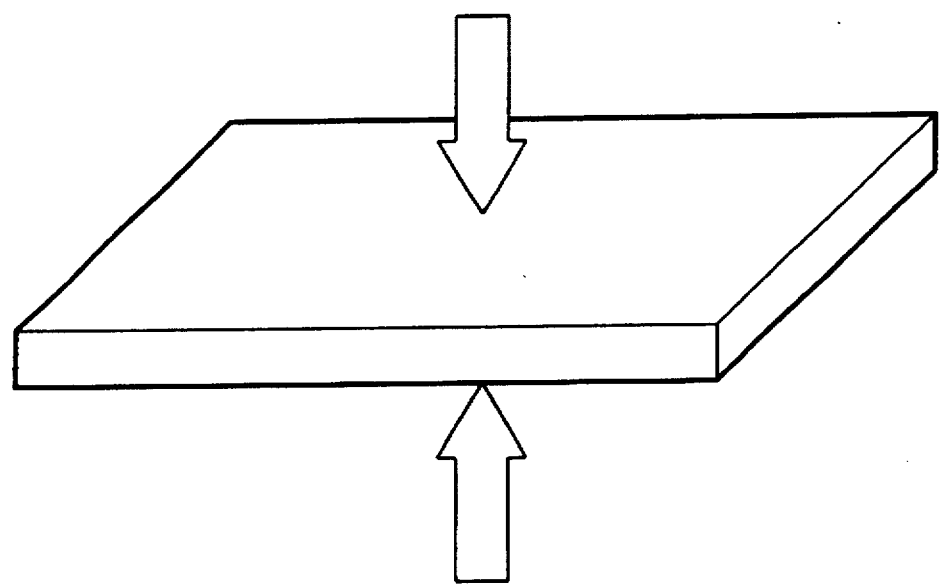
FIG. 4 illustrates a cell gap between substrates which is weighted vertically.

As shown in FIG. 3a, the lower substrate 10 having electrodes 2 may be formed on a larger substrate 100 and then separated from the larger substrate 100. Thus, it is possible to form a plurality of lower substrates 10 from the larger substrate 100. Likewise, as shown in FIG. 3b, the upper substrate 20 having electrodes 3 may be formed on a larger substrate 200 and then separated from the larger substrate 200.

As discussed above, the upper substrate 10 and lower substrate 20 form a liquid crystal cell. Then, a sealing agent is formed at the locations 13 and 23 to connect the connection electrodes 12b of the lower substrate 10 to the driving electrodes 21a of the upper substrate 20 and a mask weight is increased on both sides of the cell.

According to the present invention, the points at which the connection electrodes 12b are connected to the driving electrodes 21a (i.e., locations 13 and 23) are close to the edge of the contact hole 22. Therefore, because the mask weight on the edge of the contact hole 22 is strongest, the mask weight, on the whole, can be decreased. Consequently, the cell gap of the liquid crystal cell maintains a predetermined thickness. The gap between the lower substrate 10 and the upper substrate 20 is also filled with a liquid crystal body.

Figure 5:
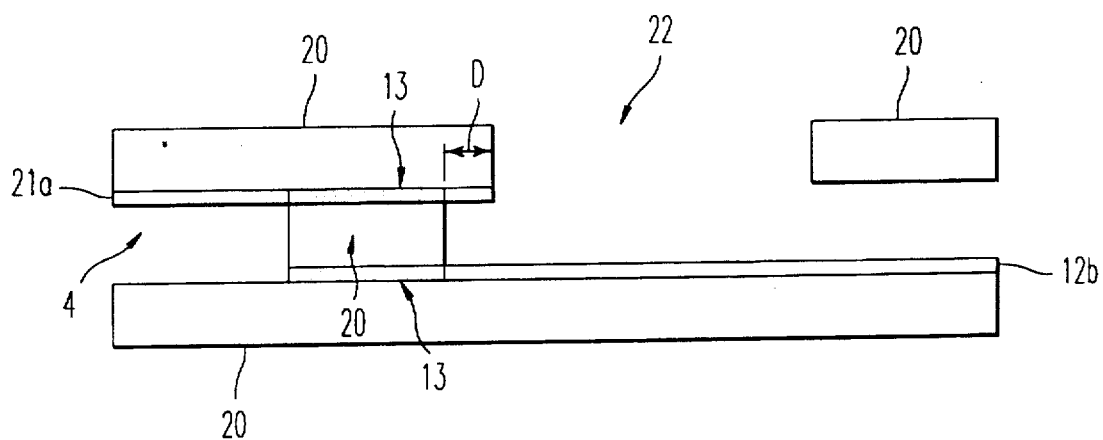
FIG. 5 is a cross-sectional view of a connection area of the liquid crystal display device according to the present invention.

For example, FIG. 5 is a cross-sectional view of a connection portion of the liquid display device according to the present invention. As shown in FIG. 5, the liquid crystal display device includes a first substrate 20 having a contact hole 22, a second substrate 10 space apart substantially and parallel from the first substrate 20 to form a gap 4. A liquid crystal body fills the gap 4. Also shown are first driving electrodes 21a on an inner side of the first substrate 20 and second driving electrodes and connection electrodes 12b on an inner side of the second substrate 10. In addition, the connection electrode 12b for connecting to an external circuit is connected to the driving electrode 21a through a seal 25, which includes electrically conductive particles. Further, upper and lower connection locations 12 and 23 are provided close to an inside edge of the contact hole 22. An external electrode (not shown) connects to the connection electrode 12b through the contact hole 22.

The entire disclosure of Japanese Patent Application No. 09-001022 filed on Jan. 8, 1997 including the specification, claims, drawings and summary are incorporated herein by reference in its entirety.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States:

1. A liquid crystal display device, comprising:

a first transparent substrate having a contact hole;

a second transparent substrate spaced apart substantially in parallel from said first transparent substrate to form a gap;

a liquid crystal body filling the gap between said first transparent substrate and said second transparent substrate;

first driving electrodes on an inner side of said first transparent substrate;

second driving electrodes and connection electrodes on an inner side of said second transparent substrate; and said contact holes configured to enable external electrodes to be connected to said second driving electrodes and said connection electrodes through said contact hole, wherein said connection electrodes are connected to said first driving electrodes at a location close to an outside edge of said contact hole.

2. The liquid crystal display device of claim 1, wherein the location connecting said connection electrodes to said first driving electrodes is at a distance which is less than 4 mm from the outside edge of said contact hole.

3. The liquid crystal display device of claim 1, wherein said first transparent substrate and said second transparent substrate comprise a plastic film.

4. The liquid crystal display device of claim 2, wherein said first transparent substrate and second transparent substrate comprise a plastic film.

5. A liquid crystal display device, comprising:

a first transparent substrate having a contact hole;

a second transparent substrate spaced apart substantially in parallel from said first transparent substrate to form a gap;

a liquid crystal body filling the gap between said first transparent substrate and said second transparent substrate;

first driving electrodes on an inner side of said first transparent substrate;

second driving electrodes and connection electrodes on an inner side of said second transparent substrate; and said contact holes configured to enable external electrodes to be connected to said second driving electrodes and said connection electrodes through said contact hole, wherein said connection electrodes are connected to said first driving electrodes at a location approximate to an outside edge of said contact hole to maintain a predetermined thickness of said gap between said first transparent substrate and said second transparent substrate.

6. The liquid crystal display device of claim 5, wherein the location connecting said connection electrodes to said first driving electrodes is at a distance which is less than 4 mm from the outside edge of said contact hole.

7. The liquid crystal display device of claim 5, wherein said first transparent substrate and said second transparent substrate comprise a plastic film.

8. The liquid crystal display device of claim 6, wherein said first transparent substrate and second transparent substrate comprise a plastic film.

9. A liquid crystal display device, comprising:

a first transparent substrate having a contact hole and first driving electrodes on an inner surface thereof;

a second transparent substrate spaced apart substantially in parallel from said first transparent substrate to form a cell gap, said second transparent substrate having second driving electrodes on an inner surface thereof;

a liquid crystal body filling the gap between said first transparent substrate and said second transparent substrate;

said contact hole configured to allow external electrodes to be connected to said second driving electrodes through said contact hole; and means for connecting said first driving electrodes to said second driving electrodes at a location approximate to an outside edge of said contact hole so as to maintain a predetermined cell gap thickness.

10. The liquid crystal display device of claim 9, wherein the means for connecting connects the first driving electrodes and the second driving electrodes at a location which is less than 4 mm from the outside edge of said contact hole.

11. The liquid crystal display device of claim 9, wherein said first transparent substrate and said second transparent substrate comprise a plastic film.

12. The liquid crystal display device of claim 10, wherein said first transparent substrate and second transparent substrate comprise a plastic film.

* * * * *